(12) United States Patent
Besselink et al.

(10) Patent No.: US 7,223,435 B2
(45) Date of Patent: May 29, 2007

(54) TRIGLYCERIDE FAT

(75) Inventors: Johanna Maria Besselink, Vlaardingen (NL); Eckhard Flöter, Vlaardingen (NL); Hindrik Huizinga, Vlaardingen (NL); Gautam Satyamurthy Nivarthy, Vlaardingen (NL); Jan Alders Wieringa, Vlaardingen (NL)

(73) Assignee: Unilever Bestfoods North America, division of Conopco, Inc., Englewood Cliffs, NJ (US)

( * ) Notice: Subject to any disclaimer, the term of this patent is extended or adjusted under 35 U.S.C. 154(b) by 461 days.

(21) Appl. No.: 10/639,235

(22) Filed: Aug. 12, 2003

(65) Prior Publication Data

US 2004/0071857 A1   Apr. 15, 2004

(30) Foreign Application Priority Data

Aug. 12, 2002 (EP) .................................. 02078327

(51) Int. Cl.
*A23D 7/00* (2006.01)

(52) U.S. Cl. ....................... 426/607; 426/601

(58) Field of Classification Search ...................... None
See application file for complete search history.

(56) References Cited

U.S. PATENT DOCUMENTS

| | | | |
|---|---|---|---|
| 2,972,541 A | | 2/1961 | Cochran et al. |
| 5,169,670 A | | 12/1992 | Yang |
| 5,731,027 A | | 3/1998 | Cain et al. |
| 5,786,019 A | | 7/1998 | Cain et al. |
| 5,849,940 A | | 12/1998 | Harris et al. |
| 5,968,584 A | * | 10/1999 | Cain et al. .................. 426/607 |
| 5,972,412 A | * | 10/1999 | Sassen et al. ................ 426/603 |
| 6,106,885 A | | 8/2000 | Huizinga et al. |
| 6,156,370 A | * | 12/2000 | Huizinga et al. ........... 426/607 |
| 6,171,636 B1 | * | 1/2001 | Sassen et al. ................ 426/603 |
| 6,808,737 B2 | * | 10/2004 | Ullanoormadam .......... 426/603 |
| 2005/0220965 A1 | | 10/2005 | Floeter |

FOREIGN PATENT DOCUMENTS

| | | |
|---|---|---|
| EP | 0 035 298 A1 | 9/1981 |
| EP | 0 081 881 A2 | 6/1983 |
| EP | 0 289 069 A2 | 11/1988 |
| EP | 0 451 781 A1 | 10/1991 |
| EP | 741 511 B1 | 8/1995 |
| EP | 0 775 444 B1 | 12/2001 |
| GB | 2 013 705 A | 8/1979 |
| WO | 96/39855 | 12/1996 |
| WO | 98/47386 | 10/1998 |
| WO | 02/41699 | 5/2002 |
| WO | 00/74469 | 12/2002 |
| WO | 00/74470 | 12/2002 |
| WO | 03/084337 | 10/2003 |

OTHER PUBLICATIONS

Swern, D. 1979. Bailey's Industrial Oil and Fat Products, vol. 1, 4th edition, John Wiley & Sons, New York, p. 6-11.*
European Search Report on EP 02 07 8327 dated Jan. 14, 2003.
International Search Report on PCT/EP 03/08075 dated Jan. 26, 2004.
Feuge et al., "Cocoa Butter-Like Fats from Domestic Oils", The Journal of the American Oil Chemists Society, vol. 35, (1958), pp. 194-199.
List et al., "Margarine and Shortening Oils by Interesterification of Liquid and Trisaturated Triglyceriedes", Journal of the American Oil Chemists' Society, American Oil Chemists' Society, vol. 72, No. 3, (1995), pp. 379-382.
Foma et al., "Kernel Oils of Seven Plant Species of Zaire", JAOCS, vol. 62, No. 5, (May 1985), pp. 910-911.
Van den Enden et al., *A Method for the Determination of the Solid Phase Content of Fats Using Pulse Nuclear Magnetic Resonance*, Fette, Seifen, Anstrichmittel, vol. 80, (1978), pp. 180-186—mentioned on p. 8 of the specification.
Idris et al., *Evaluation of Shortenings Based on Various Palm Oil Products*, J Sci Food Agric. 1989, 46, pp. 481-493.

* cited by examiner

*Primary Examiner*—Carolyn Paden
(74) *Attorney, Agent, or Firm*—Gerard J. McGowan, Jr.

(57) ABSTRACT

Preparation of a fat phase suited for the preparation of food compositions which contain liquid or solid particles stably dispersed in the fat phase, which preparation comprises mixing 0.25–20 wt. % of a structuring triglyceride fat A with 0–19.75 wt. % of a triglyceride fat C and admixing a vegetable oil up to 100%, which fat A is characterized in that the fat is non-hydrogenated and that its content of fully saturated triglycerides is 20–100 wt. %,
80–100 wt. % of its saturated fatty acid residues are palmitic acid or stearic acid residues,
0–5 wt. % of its saturated fatty acid residues are lauric acid or myristic acid residues,
<50 wt. % of its saturated triglycerides are monoacyl triglycerides and that fat C having a solid fat content at 20° C. ($N_{20}$) being at least 5 contains less than 20 wt. % of H2M fatty acid residues, where H denotes saturated fatty acid residues having chain lengths larger than 15 carbon atoms and where M denotes saturated fatty acid residues having chain lengths of either 12 or 14 carbon atoms.

20 Claims, No Drawings

TRIGLYCERIDE FAT

FIELD OF THE INVENTION

The present invention deals with a fat phase which is suitable for the preparation of food compositions which contain a fat phase and a stably dispersed non-fat phase. The fat phase can be prepared in such way that it is qualified as natural.

BACKGROUND OF THE INVENTION AND RELATED ART

Many food compositions contain a fat phase which for the major part consists of liquid oil. Often in such fat phase a structuring fat, a so-called hardstock fat is incorporated. The fat phase is prepared by blending the liquid oil and the liquefied hardstock fat at increased temperature and cooling the blend to ambient temperature. The fat blend becomes structured by a lattice of fat crystals which function is to inhibit phase separation when an aqueous or solid phase needs to be stably dispersed in the fat phase.

Until recently for selecting a vegetable hardstock fat only the following options were available:
- An (unprocessed) fat which is natural but which causes a waxy mouthfeel when used in the necessarily (high) concentrations for the preparation of e.g. a low fat spread which has to withstand relatively high ambient temperatures (20° –25° C.),
- A fat prepared by interesterification of a natural fat or a fraction of a natural fat with a lauric fat or a fraction of lauric fat. Such fat does not cause a waxy mouthfeel when used in the same spread preparation. However, it has other drawbacks: it can not impart satisfactory heat stability and it contains an undesired amount of lauric acid residues. Apart from nutritional objections, the presence of lauric fatty acid residues introduces the risk that off-taste will develop during storage of a food composition in which lipolytic activity may occur.
- A hydrogenated, so non-natural fat, preferably the widely used and renown fully hydrogenated palm oil. When used in said spread preparation this fat combines good heat stability and satisfactory mouthfeel. These qualities are not yet both existent in a non-hydrogenated hardstock fat. A fat qualifies as non-hydrogenated when neither in its preparation process, nor in obtaining its starting fat or fats hydrogenation has been applied.

Presently, in processes for edible fat preparation the use of hydrogenation preferably is avoided. However, a triglyceride fat with a good structuring performance needs a considerable amount of fatty acid residues having a saturated chain of at least 16 carbon atoms (C16+), particularly of stearic acid residues. In natural vegetable fats stearic acid is a rather rare fatty acid, but the corresponding unsaturated C18 fatty acids such as oleic acid, linoleic acid and linolenic acid are abundant. So hydrogenation is unavoidable for their transformation into stearic acid.

The demand for high quality low fat spreads of which the continuous fat phase does not exceed 50 wt. % on spread is ever increasing. For a high temperature stability of such spread an extremely effective hardstock fat is required. In the absence of such fat one has to rely on an increased concentration of one of the present hardstock fats for ensuring emulsion stability. Such increase means a relatively high content of undesired saturated fatty acids in the spread which necessarily causes a waxy mouthfeel.

In recently filed co-pending patent applications 01997222.3 and 01997223.1 the use is claimed of the natural fats Allanblackia fat and Pentadesma fat for spread manufacture. On account of their naturally high content of stearic acid and of the presence of specific structuring triglycerides these fats possess excellent structuring functionality even without modification.

Copending non-prepublished patent application PCT/EP03/02625 describes a fat phase which enables the preparation of low-fat spreads which are heat stable and exhibit good mouthfeel. A fat A used for the preparation of that fat phase is characterized by a low amount of saturated monoacyl triglycerides. It is used in admixture with a fat B which is characterized by a relatively high amount of H2M triglycerides. H denotes saturated fatty acid residues having a chain of at least 16 carbon atoms, M denotes saturated fatty acid residues having a chain of 12 or 14 carbon atoms. In these compositions the realisation of H in H2M is predominantly palmitic acid while the contribution by fat A is a defined mixture of both stearic and palmitic acid. It is the combination of both the H2M-fat and fat A which is suggested to cause the unique benificial functionality.

Now fat A has been found to exhibit as such good liquid oil structuring properties. Fat A is distinguished from hydrogenated palm oil in that it is obtained by a process avoiding hydrogenation or the use of hydrogenated fats. The present invention comprises only fat A which is non-hydrogenated.

SUMMARY OF THE INVENTION

We have found a new fat phase containing non-hydrogenated fat having good oil structuring properties and which fat phase is suited for the preparation not only of high quality stable W/O-emulsions and shortenings, either plastic or pourable, but also of food compositions with a fat phase in which solid particulate matter is stably dispersed. Such fat phase is obtained by a preparation as defined in claim 1.

DETAILS OF THE INVENTION

The invention deals with the preparation of a fat phase of which the composition is complementary to a fat phase as described in the above-mentioned non-prepublished patent application PCT/EP03/02625. Fat A is non-hydrogenated having a content of fully saturated triglycerides being 20–100 wt. %, 80–100 wt. % of its saturated fatty acid residues as palmitic acid or stearic acid residues, 0–5 wt. % of its saturated fatty acid residues as lauric acid or myristic acid residues, and <50 wt% of its saturated triglycerides as monoacyl triglycerides. The fat A is the common ingredient, but in contrast to the earlier application, in the present fat phase fat A is admixed only with the liquid oil component. Optionally an additional fat (C) is admixed, which fat must be different from the H2M fat used in said earlier patent application. Such optional fat has a solid fat content at 20° C. ($N_{20}$) being at least 5, contains less than 20 wt. % of H2M fatty acid residues, where H denotes saturated fatty acid residues having chain lengths larger than 15 carbon atoms and where M denotes saturated fatty acid residues having chain lengths of either 12 or 14 carbon atoms.

In fat A 80–100 wt. % of the content of saturated fatty acid residues consist of stearic acid and/or palmitic acid residues, while the content of lauric acid and myristic acid residues does not exceed 5 wt. %. The characteristic feature of fat A is a relatively low content of monoacyl triglycerides, which is in contrast to present hardstock fats when obtained by a process other than interesterification with a lauric fat. Those fats contain a high amount of palmitic acid residues and consequently of PPP triglycerides or they contain a high amount of stearic acid residues and consequently of SSS triglycerides. SSS, PPP and AAA triglycerides are examples of saturated monoacyl triglycerides because they consist of a single fatty acid, namely stearic acid (S), palmitic acid (P) and arachidic acid (A), respectively.

Fat A is characterized by a relatively low content of such monoacyl triglycerides, being less than 50 wt. %, preferably less than 40 wt. %, more preferably less than 30 wt. % on total fatty acid content. Without wishing to be bound by theory we believe that in fats with a relatively low content of such triglycerides, the formation of small crystals is promoted which contributes to emulsion stability. Such fat A does not cause a waxy mouthfeel.

Preferably in fat A the weight ratio (palmitic acid):(stearic acid) is in the range 75:25–25:75 and preferably the content of fully saturated triglycerides is 35–100 wt. %, more preferably 45–100 wt. % and still more preferably 50–100 wt. %.

For a non-hydrogenation preparation of fat A both a high palmitic fat (P) and a high stearic fat (S) are needed. These fats contain more than 20 wt. % of a single fatty acid, palmitic acid and stearic acid, respectively. The fat P preferably is chosen from the group consisting of palm oil, illipe oil, cottonseed oil and the high palmitic variants of soybean oil, rapeseed oil and sunflower oil. The fat S preferably is chosen from the group consisting of shea fat, mango kernel fat, Allanblackia fat, Pentadesma fat and the high stearic variants of soybean oil, rapeseed oil and sunflower oil. The stearic acid content of these so-called high stearic fats is considerably higher than the stearic acid content of the corresponding wild type fats. The same applies to the so-called high palmitic oils. Generally, those high palmitic or high stearic oils have resulted either from traditional plant breeding or from genetic modification technology. Their stearic acid and palmitic acid content may substantially exceed 20 wt. %, as can be learned from EP 741511, WO 00/74470 and WO 00/74469.

The selected fats S and P are blended and interesterified according to the process for the preparation of the new fat as defined in the claims.

Optionally, one or both of the fats S and P has/have previously been subjected to fractionation. Then the resulting stearin fraction benefits from the desirably high content of saturated triglycerides.

The processing steps for the preparation of fat A comprise a sequence of blending the selected starting fats, followed by interesterification and, optionally, a final fractionation. Hydrogenation is not part of the production process.

Whether for fat A preparation the optional final fractionation step is applied and under which conditions, depends on the actual situation. Fractionation increases the processing costs but delivers a better hardstock fat. A stearin fraction resulting from fractionation has an increased level of saturated triglycerides which contributes to hardstock functionality. However, fractionation also removes from the stearin the quickly melting $H_2O$ triglycerides which often are appreciated for their beneficial effect on the so-called low tempeature oral response of the final spread product (see below). So it depends on circumstances whether use of a final fractionation step is a good option. Said $H_2O$ triglycerides refer to the HOH and HHO triglycerides which contain two residues of a saturated fatty acid with at least 16 carbon atoms (H) and an oleic acid residue (O) which is either in the middle or one of the terminal positions.

Suitable conditions for the final fractionation step can be easily established by the skilled man taking into account the fat specifications of claim 1 and, optionally, of claim 4. Suitable fractionation temperatures are usually found in the range 35°–55° C. The stearin separation is carried out with an efficiency of at least 50%.

The hardstock functionality of non-hydrogenated fat A is comparable to that of palm oil when fully hydrogenated. Fat A is effective at low inclusion levels for stabilising emulsions and other dispersions at high ambient temperatures.

Consequently it yields a good melting behaviour which is expressed in either a good oral response or the absence of solid deposits in hot applications.

At desire the oral response of a spread prepared with the present fat phase may be further improved by incorporating in the fat phase besides fat A and the liquid oil component a further fat—in this specification denoted with fat C—which may contain a proper content of quick melting triglycerides, such as the H2O triglycerides mentioned above. Fat C has a solid fat content at 20° C. ($N_{20}$) which is at least 5. It may improve the spread's properties relating to consistency and quick melting in the 10°–25° C. range. Typically fat C results from some natural treatment such as a fractionation process, or a chemical or enzymically catalysed interesterification process or a combination of such treatments. Preferably the content of fat C will not exceed 19.75 wt. % on fat phase. Suitable fat C fats are palm oil fractions or interesterified fats, anyway having H2M concentrations below 20 wt. %.

The $N_{20}$-value, is measured by means of NMR as described in Fette, Seifen, Anstrichmittel 80, (1978), 180–186.

The present invention allows an emulsion spread to be prepared by a fully natural manufacturing process, under the following preferred conditions for fat A preparation: only natural fats P and S are selected, for the interesterification step, an enzymatic process is chosen and for the fractionation step the dry fractionation option.

As usual the major part of the fat phase is a liquid oil, usually a commodity oil such as rapeseed oil, sunflower oil, soybean oil, palm oil and mixtures of such oils.

In the context of this specification the terms oils and fats are used interchangeably. Oils usually are fats that are liquid at ambient temperatures.

For obtaining a well structured fat phase a relatively small amount of fat A will suffice. Generally its content in the fat phase is 0.25–20 wt. % on total fat blend. For the preparation of emulsion spreads the content of structuring fat preferably is in the range 0.2–15 wt. %, preferably 0.5–10 wt. %, and more preferably in the range 1–8 wt. %.

When the dispersed phase consists of solid matter, usually a concentration in the upper end of the range is preferred. Of course, also the content and the nature of the functional triglycerides in the hardstock fat determine its structuring functionality and consequently the level which is proper for stabilizing the actual product. With some trials this level can be easily established.

In a spread according to the invention the content of saturated fatty acids can be kept below 25 wt. %, or even below 20 wt. % on total fat phase.

A low content of hardstock fat is not only an economical and organoleptic, but also a nutritional advantage: reducing the content of saturated fatty acids in the final food composition such as a spread, results in a favourably low Keys value. A fat's Keys value, is a measure for the nutritional effect of fat intake on blood cholesterol level and thus is a risk indicator for affecting cardiovascular health. A high Keys value means that consumption of the fat adversely affects the blood cholesterol level.

The Keys value therefore distinguishes fats which are related to high incidence of cardiovascular diseases from fats which even counteract the incidence of such diseases.

The fat phase according to the invention is suited for the preparation of shortenings, edible emulsions and other dispersions containing a fat phase. It is particularly suited for fat continuous emulsion spreads with a low, that is 20–50 wt. % fat content, which have to remain stable at relatively high ambient temperatures.

A process for the manufacture of fat continuous emulsions pourable as well as plastic emulsions forms part of the present invention. Such manufacturing process is defined in the claims. When the emulsion is a low fat spread, it preferably contains 20–50 wt. %, more preferably 30–45 wt. % of fat phase.

Although the products of the invention are said to be prepared with a vegetable fat phase, the invention also comprises products where a part of the fat phase has been substituted by dairy fat.

In case the product is a water in oil emulsion, the aqueous phase of the emulsion is prepared with the usual ingredients such as water, one or more emulsifiers, preferably a lecithine and/or partial glycerides, gelling and/or thickening agents, salt, colouring agent, flavour, a preservation agent and proteins of dairy or vegetable origin.

The aqueous phase may contain some dispersed fat phase. The process eventually results in an O/W/O-emulsion, which is a subspecies of the emulsions according to the present invention.

After mixing the ingredients both phases are processed according to common manufacturing technology which is well known to the man skilled in the art. Details can be found in various textbooks such as K. A. Alexandersen, Margarine Processing Plants and Equipment (Vol.4, Bailey's Industrial Oil and Fat Products, Wiley and Sons Inc., New York 1996).

A crude pre-emulsion is prepared which is subjected to cooling and working treatments employing scraped surface heat exchangers and pin stirrers, which eventually results into the desired plastic spread or pourable margarine product.

The found fat phase is also suited for the preparation of food compositions not being a W/O-emulsion which comprise a fat phase which needs structuring, because solid particulate matter are to be stably dispersed.

The main ingredients of those food compositions are fat (e.g. 30–90 wt. %, preferably 30–70 wt. % on total composition) and solid (non-fat-soluble) particulate matter (e.g. 70–10 wt. %, preferably 70–30 wt. % on total composition). Such compositions comprise sauce concentrates, sauce base products, spice mixes, sizzle mixes, stir fry mixes, etcetera. In such composition the fat phase preferably is a fat which is liquid at ambient temperature. Examples of solid particulate matter comprise (next to other components) flour, starch, starch-derivatives, salt, sugar, herbs, spices, nuts, gums and cheese. For preservation reasons such compositions preferably will have a low water content (preferably less than 20 wt. %, more preferably less than 10 wt. % of water).

Use of the fat phase of the invention for such compositions prevents settling of the particulate solid matter and/or oil exudation. EP 775444 and WO98/47386 describe similar compositions but these have a different stabilising system. The composition may contain further ingredients which are commonly used for their preparation.

We have found that compositions can be prepared comprising 30–90 wt. %, preferably 30–70 wt. % of a fat phase and 70–10 wt. %, preferably 70–30 wt. % of solid particulate matter which remains stably dispersed when the fat phase contains 0.1–15 wt. % (on total fat phase) of fat A.

For obtaining a product containing particulate matter first a mixture of oil and fat A is prepared, preferably on a spreads processing line. After stirring in the dry particulate matter the product may be filled in containers like bottles, jars or tubs. Similar preparations are described in said references said references EP 775444 and WO 98/47386.

An alternative manufacturing process comprises the following steps:
  prepare a mixture (a) of all fat A and a part of the oil, such that a composition is obtained comprising only 10–70% wt of the fat phase of the final product and heat the mixture up to a temperature in the range 50°–90° C.,
  prepare a mixture (b) of the dry components with the remaining oil and keep the mixture at a temperature below 50° C., preferably below 35° C.,
  mix (a) and (b), (a) having a temperature in the range 50°–90° and (b) having a temperature below 50–° C.,
  fill the mixture into containers.

According to a further alternative fat A is added only after the oil in the first step is heated to 50–90° C. and only then mixture (b) is admixed.

The invented fat is a valuable, really multi-purpose stabiliser, suited for the preparation of both plastic and pourable emulsions and dispersions of solid particles.

If not indicated otherwise percentages relate to total fat phase.

The following examples illustrate the invention.

EXAMPLE 1

Preparation of Liquid Margarine

Three 80 wt. % fat containing liquid margarines were produced employing a standard line of labscale Votator™ equipment.

Selected fat phase ingredients:
sunflower oil
hardstock fat
soybean lecithin

The fat phase was prepared by mixing said ingredients in the amounts shown in Table I. 80.25 wt. parts of the fat phase were mixed with 19.75 wt. parts of water and the mixture was stored at 60° C. in a premix tank.

Two liquid margarines denoted (B) and (C) were prepared with a hardstock fat having a composition according to the invention (see Table I). For comparison a liquid margarine denoted (A) was prepared with fully hydrogenated high erucic rapeseed oil has hardstock fat. For each of the margarines four samples have been prepared.

With a throughput of 4 kg/h the premix was pumped from the premix tank through a series of three scraped surface heat exchangers which lowered the temperature of the emulsion to approximately 5° C. For completing the fat crystallisation process the emulsion was conducted through a holding unit (0.15 l) and a pin stirrer (operating at 1500 rpm).

At the exit of the pin stirrer samples of the product, having a temperature of approximately 16° C., were discharged into several 0.4 l containers which were stored at 5° C., 15° C. and 25° C. respectively for 2 weeks.

For all samples the most relevant liquid margarine properties: pourability and oil exudation were established. The pourability was established visually by pouring approximately 5 ml of product on a flat surface and rating the degree to which the product flow spreaded. A rating of 1 is no significant spread, a rating of 2 means reasonable pourability and a rating of 3 means good pourability.

Stability was measured by establishing oil exudation. Oil exudation was assessed by visually determining the thickness of the oil layer that has separated on top of the emulsion after the storage period. Oil exudation is the thickness of the separated layer expressed as a percentage of the length of the sample column.

Compositions, properties and evaluation results are shown in Table I.

TABLE I

| | Sample | | |
|---|---|---|---|
| | (A)* | (B) | (C) |
| Composition | | | |
| Liquid oil | 78% SF (1) | 75% SF (1) | 74.2% SF 1) |
| Structuring fat | 2% heRP (2) | 5% fat B (3) | 5.8% fat C (4) |
| Soybean lecithin | 0.25% | 0.25% | 0.25% |
| Water | 19.75% | 19.75% | 19.75% |
| Hydrogenated ? | YES | NO | NO |
| Properties | | | |
| Pourability | 3 | 2.5 | 2 |
| Oil Exudation | | | |
| 5° C. | 1.4% | 0.5% | 0.1% |
| 15° C. | 1.8% | 1.7% | 1.4% |
| 25° C. | 2.8% | 1.7% | 1.4% |
| Fully saturated TAG's in structuring fat | 100% | 66% | 50.8% |
| Monoacid TAG's in saturated TAG's | 2.2% | 29.5% | 58.6% |
| Saturated fatty acids | | | |
| Lauric (C12) | Traces | 0.2% | 0.3% |
| Myristic (C14) | Traces | 0.9% | 1.2% |
| Palmitic (C16) | 4.9% | 53% | 49.5% |
| Stearic (C18) | 36.6% | 27.7% | 28.4% |
| Other (>C18) | 58.5% | 1.2% | 2% |

*Sample for Comparison
(1) sunflower oil
(2) fully hydrogenated high erucic rapeseed oil
(3) stearin fraction of a dry fractionated chemically interesterified mixture of 38 wt. % of sheanut oil and 62 wt. % of palm stearin.
(4) chemically interesterified mixture of 40 wt. % of wet fractionated stearin fraction of sheanut oil and 60 wt. % of a dry fractionated palm stearin.

It appears to be possible to manufacture liquid margarines with a non-hydrogenated hardstock fat that possess a similar emulsion stability as a liquid margarine prepared with the reference hydrogenated hardstock fat which is known to be particularly suited for the fabrication of pourable products. In numerous researches this reference fat has proven to outperform other hydrogenated hardstock fats for liquid margarine application due to its favourable contribution to stability and pourability behaviour. However, now it is surprisingly found that the fat compositions according to the invention have a similar performance with respect to those properties. The fat compositions according to the invention, in contrast to other hardstock fats which are hydrogenated, combine pourability and product stability almost as good as the hydrogenated benchmark fat, fully hydrogenated high erucic rapeseed oil and, moreover, have the benefit of their naturalness appeal.

EXAMPLE 2

An alternative structuring fat according to the invention can be fabricated following the processing guidelines given in the description above of the invention. A mixture of 60 wt. parts of a dry fractionated palm stearin with an Iodine Value of 14 and 40 wt. parts of a wet fractionated shea butter stearin (a fraction containing at least 60 wt. % of stearic acid) are interesterified under standard conditions well known to the man skilled in the art.

The composition of the starting fats and the final structuring fat according to the invention are shown in table II.

From this table it appears that it is easy to manufacture a structuring fat according to the invention once the rules governing the design of the final fat are known. According to these rules and the basic rules of thumb known to the man in the art, the chosen combination of starting fats is interesterified optionally followed by an final fractionation step. The structuring fat prepared according to example 2 is perfectly suited to act as a substitute for the structuring fat described in example 1.

TABLE II

| Fat (2) | Palm stearin IV 14 (3) | Shea butter stearin (1) | Interesterified mixture of 60 PalmS/40 SheaS |
|---|---|---|---|
| Fully saturated TAG's (wt. %) | 64 | 2.3 | 51.6 |
| Monoacid TAG's (wt. % of fully sat. TAG's) | 64 | 77 | 14.5 |
| Palmitic + stearic acid (wt. % on total SAFA) | 96.5 | 95.7 | 96.2 |
| Lauric + myristic acid (wt. % on total SAFA) | 1.8 | Less than 0.2 | 1.1 |
| Ratio palmitic to stearic acid | 94:6 | 5:95 | 66:34 |

(1) Shea butter stearin is a fraction containing at least 60 wt. % of stearic acid.
(2) TAG: triacylglycerides, SAFA; saturated fatty acids
(3) IV: iodine value For the above fats, both the two starting fats and the obtained fat serving as fat A to fabricate a fat phase according to the invention, their crystallisation behaviour have been studied. The fats were dissolved at 1 wt. % concentrations in sunflower oil and subsequently crystallised and observed through a light microscope. The microscope sample was cooled at various rates but the general finding remained unchanged: while the two starting fats crystallized in rather coarse and large crystals, the product fat developed a larger number of much smaller and finer crystals.

This different crystallisation behaviour is related to the superior structuring ability of the obtained fat when used for preparing the fat phase of the invention when compared to other natural fats.

EXAMPLE 3

Composition Containing Particulate Matter Stably Dispersed in a Fat Phase

The composition was prepared using the ingredients of Table III by a batch process comprising the steps:
prepare at about 70° C. a mixture (a) of all structuring fat and so much of the oil, that mixture (a) comprises 30 wt. % of the fat phase of the final product,
prepare at room temperature mixture (b) of the remaining oil and the dry components and herbs,
mix (a) and (b), (a) having a temperature of about 70° C. and (b) being at ambient temperature,
fill the mixture into jars.

TABLE III

| Ingredients | wt. % |
| --- | --- |
| Dry components (flour and spices) | 49 |
| Fresh herbs | 1 |
| Sunflower oil | 46 |
| Structuring fat A of example 2 | 4 |

Six weeks after production measurement of the hardness (expressed as Stevens value) showed 413 g at 5° C., 526 g at 20° C. and 288 g at 30° C. After said storage, surprisingly, no or hardly any oil exudation was observed, even when stored at 30° C.

The shown performance of the non-hydrogenated fats according to the invention is comparable to the commonly used hydrogenated counterparts.

The invention claimed is:

1. A preparation of a fat phase comprising mixing 0.25–20 wt.% of a structuring triglyceride fat A with 0–19.75 wt% of a triglyceride fat C and admixing a vegetable oil up to 100%, which fat A is non-hydrogenated having
a content of fully saturated triglycerides being 20–100 wt%,
80–100 wt.% of its saturated fatty acid residues as palmitic acid or stearic acid residues,
0–5 wt.% of its saturated fatty acid residues as lauric acid or myristic acid residues,
<50 wt% of its saturated triglycerides as monoacyl triglycerides and which fat C, having a solid fat content at 20° C. ($N_{20}$) being at least 5, contains less than 20 wt.% of H2M fatty acid residues, where H denotes saturated fatty acid residues having chain lengths larger than 15 carbon atoms and where M denotes saturated fatty acid residues having chain lengths of either 12 or 14 carbon atoms.

2. A preparation according to claim 1, where a fat A is used having a content of monoacyl triglycerides being <40wt.%.

3. A preparation according to claim 1, where in fat A the weight ratio (palmitic acid):(stearic acid) is in the range 75:25–25:75.

4. A preparation according to claim 1, where in fat A the content of fully saturated triglycerides is 35–100 wt.%.

5. A preparation according to claim 1, where the fat phase contains 0.25–15 wt% of fat A.

6. A preparation according to claim 1, where the vegetable oil is selected from the group consisting of rapeseed oil, sunflower oil, soybean oil and mixtures of these oils.

7. A preparation according to claim 1, where fat A is prepared according to the steps
1. Selecting a fat (S) which contains >20 wt.% of stearic acid residues and a fat (P) which contains >20 wt.% of palmitic acid residues,
2. Blending fats S and P in such ratio that the blend complies with the ratio of palmtiic and stearic acid residues as defined in claim 1,
3. Subjecting the blend to interesterification,
4. Optionally subjecting the interesterified fat to fractionation and collecting the stearin fraction under such fractionation conditions that
the fractionation temperature is in the range 35°–55° C.,
the efficiency of the olein/stearin separation is at least 50%,
the stearin fat includes fully saturated triglycerides at 35–100 wt.%.

8. A preparation according to claim 7, where the applied interesterification process is an enzymatic process.

9. A preparation according to claim 7, where fractionation is carried out as a dry fractionation process.

10. A preparation according to claim 7, where both fat P and fat S are natural fats.

11. A preparation according to claim 7 where fat P is selected from the group consisting of palm oil, illipe oil, cottonseed oil and the high palmitic variants of soybean oil, rapeseed oil and sunflower oil.

12. A preparation according to claim 7 where fat S is selected from group consisting of shea fat, Allanblackia fat, Pentadesma fat, mango kernel oil and the high stearic variants of soybean oil, rapeseed oil and sunflower oil.

13. An edible W/O emulsion comprising 15–80 wt.% of a fat phase and 20–85 wt.% of a dispersed aqueous phase, where the fat phase consists of a fat phase prepared according to claim 7.

14. A preparation according to claim 1 in which one or both of fats S and P have been subjected to a fractionation treatment.

15. A process for the preparation of an edible W/O-emulsion comprising the fat phase prepared according to claim 1 comprising the steps
emulsifying 50–80 wt.% of an aqueous phase with 20–50 wt.% of a the fat phase and
cooling and working the emulsion in the usual way to obtain a W/O-emulsion with the desired consistency.

16. An edible composition containing a fat phase and not being a W/O-spread, where a fat phase is used prepared according to claim 1.

17. An edible composition according to claim 1, where it comprises 30–70 wt.% of the fat phase prepared according to claim 1, 70–30 wt.% of solid non-fat soluble particulate matter, said fat phase comprising 0.1–15 wt.% on total fat phase of fat A.

18. A composition according to claim 17, where the solid non-fat-soluble particulate matter is selected from the group comprising four, starch, starch-derivatives, salt, sugar, herbs, vegetables, tomatoes, olives, spices, nuts, gums and cheese.

19. A process for preparing a composition according to claim 17, said process comprising the steps of:
preparing a mixture (a) of all fat A and such part of the liquid oil component, that a composition is obtained comprising only 10–70 wt.% of the fat phase of the final product and heating the mixture up to a temperature in the range 50–90° C., preparing a mixture (b) of the particulate matter with the remaining liquid oil component and keeping the mixture at a temperature below 50° C., mixing (a) and (b), (a) having a temperature in the range of 50–90° C. and (b) having a temperature below 50° C.

20. A process for preparing a composition according to claim 17, said process comprising the steps of:

preparing a mixture (a) of all fat A and such part of the oil which has been heated up to a temperature in the range 50–90° C., that a composition is obtained comprising only 10–70 wt.% of the fat phase of the final product, preparing a mixture (b) of the particulate matter with the remaining oil and keeping the mixture at a temperature below 50° C., mixing (a) and (b), (a) having a temperature in the range of 50–90° C. and (b) having a temperature below 50° C.

* * * * *